(12) United States Patent
Schneider

(10) Patent No.: US 8,065,985 B2
(45) Date of Patent: Nov. 29, 2011

(54) PISTON HAVING A CENTRAL COOLING GALLERY WITH A CONTOURED FLANGE

(75) Inventor: Norbert Schneider, Ann Arbor, MI (US)

(73) Assignee: Federal-Mogul Corporation, Southfield, MI (US)

(*) Notice: Subject to any disclaimer, the term of this patent is extended or adjusted under 35 U.S.C. 154(b) by 400 days.

(21) Appl. No.: 12/434,713

(22) Filed: May 4, 2009

(65) Prior Publication Data

US 2010/0275861 A1    Nov. 4, 2010

(51) Int. Cl.
*F02F 3/00* (2006.01)
(52) U.S. Cl. .............. 123/193.1; 123/41.35; 92/208; 92/231; 92/214; 92/224; 92/186
(58) Field of Classification Search .......... 123/193.1, 123/41.35; 92/208, 231, 214, 224, 186
See application file for complete search history.

(56) References Cited

U.S. PATENT DOCUMENTS

| | | | |
|---|---|---|---|
| 2,815,011 A | 12/1957 | Holt | |
| 3,613,521 A | 10/1971 | Itano | |
| 4,175,502 A | 11/1979 | Moebus | |
| 4,286,505 A | 9/1981 | Amdall | |
| 4,377,967 A | 3/1983 | Pelizzoni | |
| 4,517,930 A | 5/1985 | Nakano et al. | |
| 4,581,983 A | 4/1986 | Moebus | |
| 4,587,932 A | 5/1986 | Moebus | |
| 5,065,706 A | 11/1991 | Zvonkovic | |
| 6,477,941 B1 | 11/2002 | Zhu et al. | |
| 6,494,170 B2 | 12/2002 | Moloney et al. | |
| 6,651,549 B2 | 11/2003 | Zhu et al. | |
| 6,840,155 B2 | 1/2005 | Ribeiro et al. | |
| 2001/0025568 A1 | 10/2001 | Kemnitz et al. | |
| 2003/0037671 A1 | 2/2003 | Zhu | |
| 2003/0188633 A1 | 10/2003 | Griffiths et al. | |
| 2008/0314240 A1* | 12/2008 | Walker et al. | 92/186 |

FOREIGN PATENT DOCUMENTS

| | | |
|---|---|---|
| EP | 0359932 A2 | 3/1990 |
| EP | 0464626 A1 | 1/1992 |
| WO | 8002308 A1 | 10/1980 |
| WO | WO 01-27441 A1 | 4/2001 |
| WO | WO 02-33291 A1 | 4/2002 |
| WO | WO 03-025358 A1 | 3/2003 |

* cited by examiner

*Primary Examiner* — Michael Cuff
*Assistant Examiner* — James Kim
(74) *Attorney, Agent, or Firm* — Robert L. Sterns; Dickinson Wright PLLC

(57) ABSTRACT

A piston has an upper crown portion with an upper combustion wall against which combustion forces act and a lower crown portion with a pair of pin bosses spaced for receipt of a small end of a connecting rod therebetween. The upper crown portion and the lower crown portion form an outer oil gallery and a central oil gallery in fluid communication with one another. The central oil gallery is formed in part by an annular flange extending radially inwardly from the outer oil gallery and upwardly toward the upper combustion wall to a free edge spaced from the upper combustion wall. The free edge forms an opening about a central axis of the piston and has a non-planar uppermost surface with depressions aligned diametrically opposite one another across the opening to improve the oil flow throughout the central oil gallery.

9 Claims, 4 Drawing Sheets

PISTON HAVING A CENTRAL COOLING GALLERY WITH A CONTOURED FLANGE

BACKGROUND OF THE INVENTION

1. Technical Field

This invention relates generally to pistons for internal combustion engines, and more particularly to pistons having a central oil cooling gallery.

2. Related Art

Piston constructions having a central oil cooling gallery or two substantially closed oil cooling galleries (dual galleries) are known. The dual gallery pistons have an annular, radially outer gallery and an open central gallery formed between upper and lower crown portions. The outer and central galleries can be isolated from one another or in fluid communication with one another via oil passages. In addition, it is known to provide pin lubrication passages extending from one or both of the galleries to a wrist pin. The lubrication passages can extend into a wrist pin bore of a pin boss and/or between laterally spaced pin bosses. The outer gallery is particularly suited for cooling a ring belt region of the piston, while the central gallery is particularly suited for cooling a central crown region formed in part by a combustion bowl wall, which is exposed to hot combustion gasses.

The combustion bowl and central crown region is exposed to extreme heat in use. As such, the aforementioned central galleries need to provide ample oil flow in order to provide adequately cooling to the central gallery region. Although central galleries, both closed and open, are known, issues remain in providing adequate cooling in the central crown region. In particular, continual efforts remain to both provide sufficient oil flow in the central crown region while at the same time avoiding "cooking" and deteriorating the oil. If the oil directed to the central gallery region is allowed to remain in the region for too long of a timeframe, the oil cooks, thereby diminishing both the cooling and lubrication functions of the oil. On the other hand, if the oil is allowed to flow outwardly from the central gallery too quickly, the cooling function of the oil is diminished in the central gallery region, thereby potentially reducing the useful life of the piston.

SUMMARY OF THE INVENTION

A piston includes a piston body having an upper crown portion with an upper combustion wall against which combustion forces act and a lower crown portion with a pair of pin bosses spaced for receipt of a small end of a connecting rod therebetween. The pin bosses have pin bores aligned with one another along a pin bore axis. The upper crown portion and the lower crown portion form an outer oil gallery and a central oil gallery in fluid communication with one another. The central oil gallery is formed in part by a flange extending radially inwardly from the outer oil gallery and upwardly toward the upper combustion wall to a free edge spaced from the upper combustion wall. The free edge forms an opening and has a non-planar uppermost surface with depressions aligned diametrically opposite one another across the opening.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
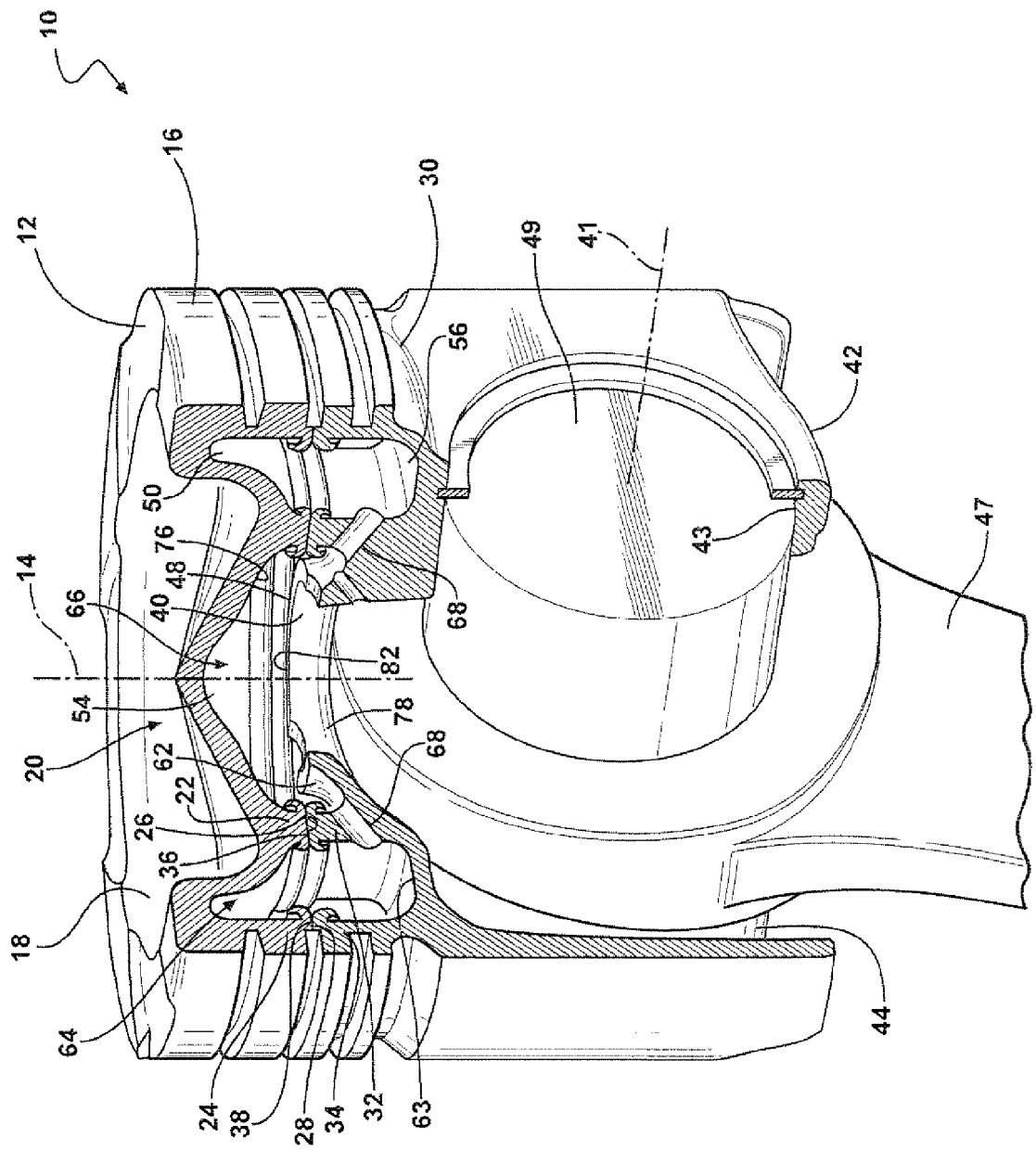
FIG. 1 is a partial cross-sectional view of a piston constructed in accordance with one presently preferred aspect of the invention.
Figure 2:
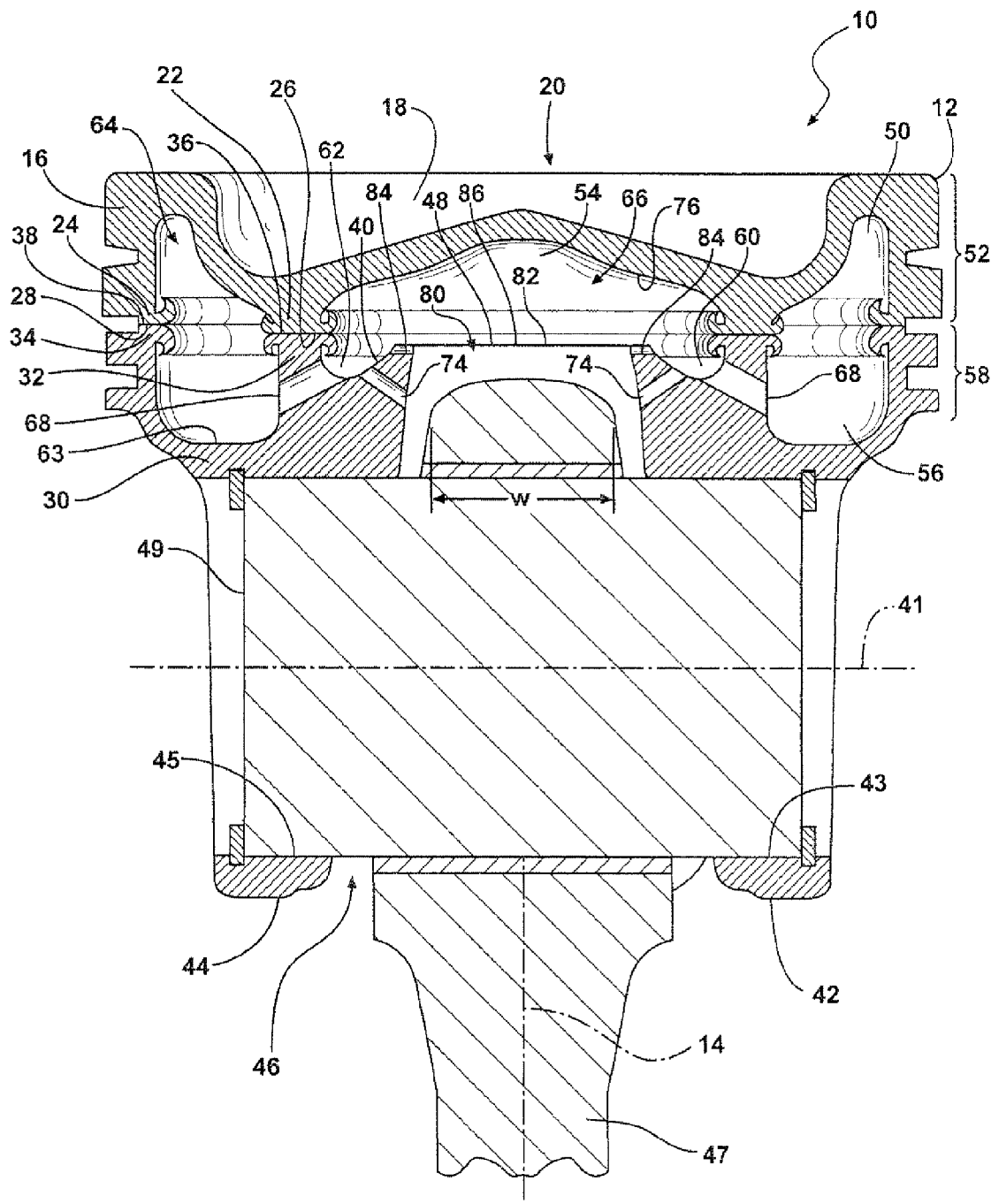
FIG. 2 is a cross-sectional view taken generally along line 2-2 of FIG. 1.
Figure 3:
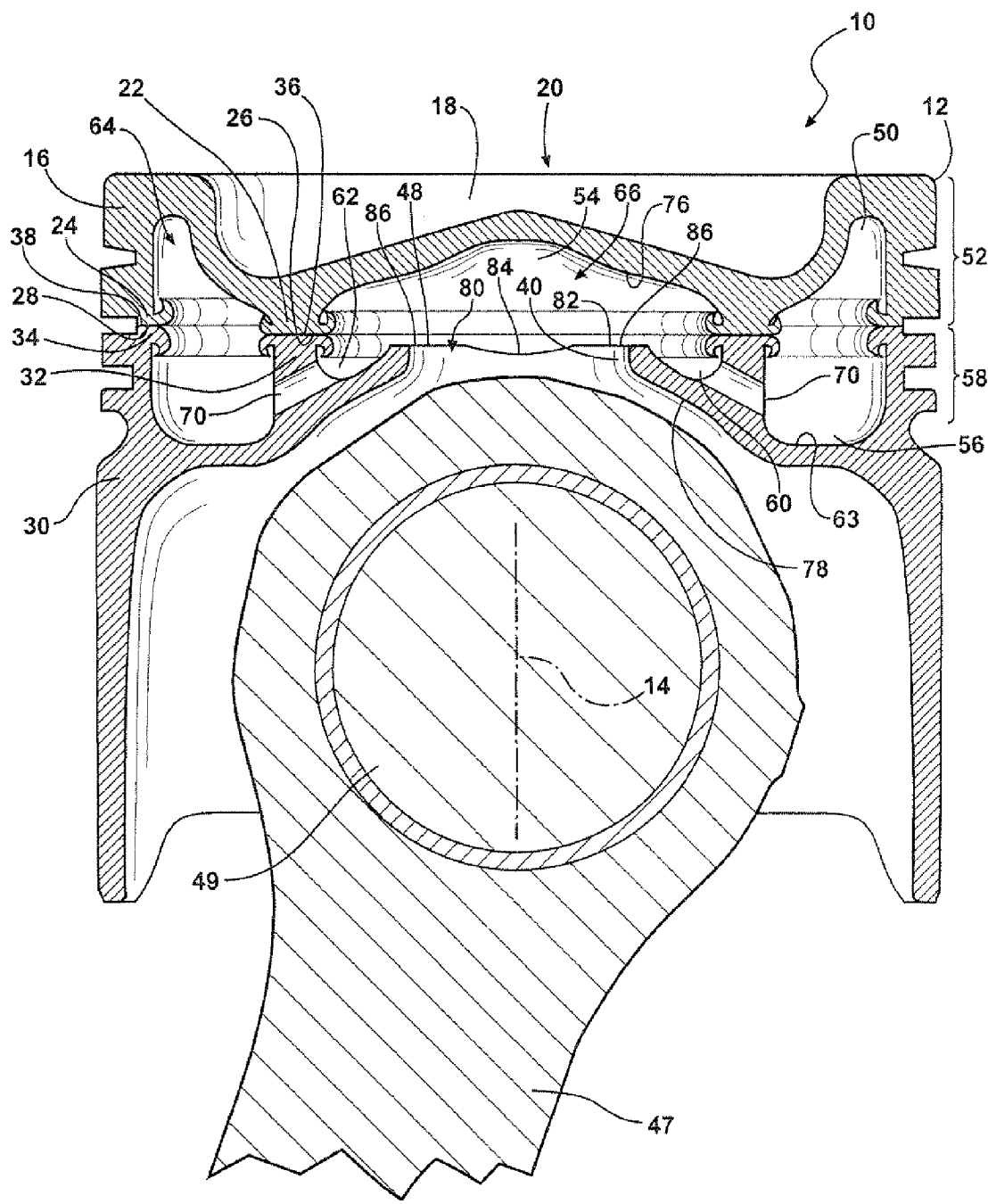
FIG. 3 is a cross-sectional view taken generally along line 3-3 of FIG. 1.

Referring in more detail to the drawings, FIGS. 1-3 illustrate a piston 10 constructed in accordance with one presently preferred aspect of the invention. The piston 10 has a piston body 12 extending along a central axis 14 along which the piston body reciprocates within a cylinder bore (not shown). The piston body 12 includes an upper crown portion 16 having an upper combustion wall 18, represented here, by way of example and without limitation, as providing a recessed combustion bowl 20, against which combustion forces directly act in the cylinder bore, thereby providing a location for extreme heat generation. As referenced in FIGS. 2 and 3, the upper crown portion 16 has at least one, and shown here as a pair of annular upper ribs, referred to hereafter as an upper inner rib 22 and upper outer rib 24, depending from the upper combustion wall 18 to respective free ends 26, 28. The piston body 12 further includes a lower crown portion 30 having at least one, and shown here as a pair of annular lower ribs, referred to hereafter as a lower inner rib 32 and lower outer rib 34, extending to respective free ends 36, 38 arranged in alignment for engagement with the free ends 26, 28 of the upper ribs. The lower crown portion 30 further includes an inner gallery floor 62 provided by an annular flange 40 extending radially inwardly and upwardly from the lower inner rib 32 toward the upper combustion wall 18 and a pair of pin bosses 42, 44 depending generally from the flange 40 to provide a pair of wrist pin bores 43, 45 aligned along a pin axis 41 for receipt of a wrist pin 49 with a space 46 provided between the pin bosses 42, 44 for receipt of a small end of a connecting rod 47. The annular flange 40 has an upper annular free edge 48 that extends generally into the upper crown portion 16 in axially spaced relation with the upper combustion wall 18, wherein the free edge 48 is contoured to provide an optimal oil flow beneath the upper combustion wall 18 such that optimal cooling results without "cooking" the oil.

Figure 4:
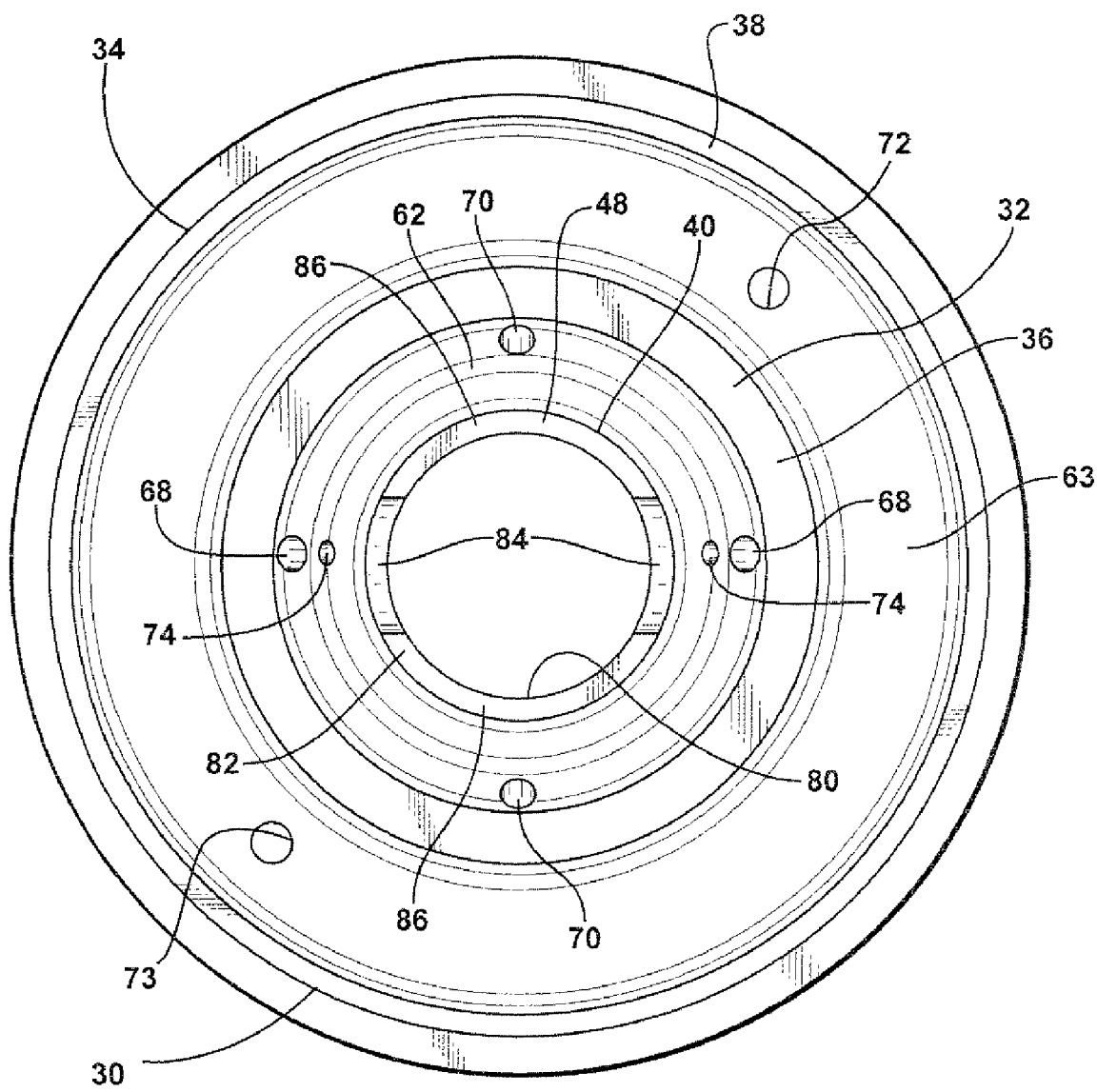
FIG. 4 is a plan view of a lower crown portion of the piston of FIG. 1.

The upper crown portion 16 is formed having an annular outer oil gallery pocket 50 extending from the inner and outer rib free ends 26, 28 upwardly into an upper ring belt region 52 and an annular inner oil gallery pocket 54 extending from the inner free end 26 and upwardly beneath the combustion bowl 20. The lower crown portion 30 is formed, such as in a casting or forging process from steel or other metal, having an annular outer oil gallery pocket 56 extending from the inner and outer rib free ends 36, 38 downwardly into a lower ring belt region 58 and an annular inner oil gallery pocket 60 extending from the inner free end 36 and the flange free edge 48 downwardly to the valley or floor 62, wherein the floor 62 is raised axially relative to a floor 63 of the outer oil gallery pocket 56. Upon attaching the upper crown portion 16 to the lower crown portion 30, an annular outer oil gallery, represented here as a substantially closed outer oil gallery 64, and an inner or central oil gallery 66 is formed. The outer oil gallery 64 is bounded by the outer ribs 24, 34 and inner ribs 22, 32, while the central oil gallery 66 is formed and bounded in part by the flange 40, wherein the flange 40 extends radially inwardly from the outer oil gallery 64 to its free edge 48. To facilitate cooling the piston 10, one or more oil flow passages are provided in the lower ribs 32, 34 and/or the flange 40. For example, as shown in FIGS. 1 and 2, a pair of oil passages 68 extend through the lower inner rib 32 generally along the pin bore axis 41, and as shown in FIG. 3, a pair of oil passages 70 extend through the lower inner rib 32 generally transverse to the pin bore axis 41 to bring the outer oil gallery into fluid communication with the central oil gallery 66. The oil passages 68, 70 ascend from a lower most portion of the outer oil gallery 64 to the floor 62 of the inner oil gallery pocket 60. Further, as shown in FIG. 4, a pair of respective inlet and outlet oil flow openings 72, 73 extend through the lowermost floor 63 of the outer oil gallery pocket 56 in diametrically opposed relation to one another generally 45 degrees from the axis 41. As such, oil from the crankcase is able to flow upwardly into the outer oil gallery 64 through the inlet opening 72, whereupon the oil is circulated about the outer oil gallery 64 and channeled inwardly through the oil flow passages 68, 70 into the partially open central oil gallery 66. Further, oil can flow downwardly out of the outer oil gallery 64 through the outlet opening 73. In addition, to facilitate flow of the oil from the central oil gallery 66 to the wrist pin/connecting rod joint region, as shown in FIG. 2, a pair of oil passages 74 extend through the flange 40, wherein the passages 74 descend from the floor 62 of the inner oil gallery pocket 62 radially inwardly to the space 46 between the pin bosses 42, 44. The oil passages 74 are represented here as extending generally along the direction of the pin bore axis 41.

The annular flange 40 is formed as a circumferentially continuous, circular or round wall, and is represented, by way of example, as ascending along an arcuate path upwardly in a radially inward direction from the inner rib 32 to provide the floor 62 with a generally concave surface. It should be recognized that the floor 62 could be constructed having a substantially straight or convex surface, if desired. The flange 40 extends to the free edge 48 in close approximation to the height of the inner and outer lower ribs 32, 34, such that a portion of the free edge 48 can be planar or substantially planar with the ribs 32, 34, by way of example and without limitation. As such, the inner rib 32 and the flange 40 cooperate to form an annular oil collection basin to regulate the flow of the oil throughout the central oil gallery 66. As formed, the flange 40 functions to provide an "oil shake", analogous to a cocktail shaker, between the floor 62 of the flange 40 and a bottom surface 76 of the upper combustion wall 18, wherein the oil can also splash against a bottom surface 78 of the flange, as the central oil gallery 66 is not enclosed. While the oil is being channel throughout the central oil gallery 66, a portion of the oil can flow through the oil passages 68, 70 toward the pin bore joint established between the wrist pin 49, pin bores 43, 45 and connecting rod small end, and the remaining oil can be directed through an annular upper opening 80 formed by the flange upper free edge 48. The opening 80 is formed as a circular or substantially circular opening centered about the central axis 14. As shown in FIG. 2, the opening 80 is sized having a diameter the same as or approximating a width (W) of a free end of the connecting rod 47, further providing for the free exchange of heat with relatively cool air through the opening 80.

To further assist in regulating the flow of the oil throughout the central oil gallery 66, the annular free edge 48 is formed having a non-planar, contoured upper surface 82. The non-planar upper surface is provided by a pair of recessed scallops that depend into the flange 40, referred to hereafter as depressions 84. The depressions 84 are formed diametrically opposite one another across the opening 80, with each depression 84 spanning between about 5 to 45 degrees. The portion of the flange upper surface 82 extending between the depressions 84 is formed having a planar or substantially planar surface 86. To ensure the oil is optimally directed to the desired locations, the depressions 84 are formed along the pin axis 41, and are shown here as being centered along the pin axis 41 in mirrored relation to one another. The depressions 84 can be formed having a smooth, non-stepped transition with the planar surfaces 86. In addition, the depressions 84 can be formed having a concave contour, with a lowermost portion of the depression being aligned or substantially aligned over the pin axis 41.

Obviously, many modifications and variations of the present invention are possible in light of the above teachings. For example, it is contemplated that the piston could be constructed as a monolithic piece of material, such as by being formed in a single steel cast process. It is, therefore, to be understood that within the scope of the appended claims, the invention may be practiced otherwise than as specifically described.

What is claimed is:

1. A piston, comprising:
a piston body extending along a central axis along which the piston reciprocates and having an upper crown portion with an upper combustion wall against which combustion forces act and a lower crown portion with a pair of pin bosses spaced for receipt of a small end of a connecting rod there between, said pin bosses having pin bores aligned with one another along a pin bore axis, said upper crown portion and said lower crown portion forming an outer oil gallery and a central oil gallery in fluid communication with one another, said outer and inner galleries separated by an annular wall; and said central oil gallery being formed in part by a flange extending radially inwardly from said annular wall and upwardly toward said upper combustion wall to a free edge spaced from said upper combustion wall, said free edge forming an opening about said central axis and having a non-planar uppermost surface including depressions aligned opposite one another across said opening.

2. The piston of claim 1 wherein said depressions are aligned along said pin bore axis.

3. The piston of claim 2 wherein said free edge has planar surfaces extending between said depressions.

4. The piston of claim 3 wherein said depressions have a concave surface that transitions smoothly with said planar surfaces.

5. The piston of claim 1 wherein said opening is circular.

6. The piston of claim 5 wherein said opening is centered about said central axis.

7. The piston of claim 6 wherein said opening has a diameter approximating a width of the small end of the connecting rod.

8. The piston of claim 1 where each of said depressions spans between about 25 to 45 degrees.

9. The piston of claim 1 wherein said upper crown portion has an annular rib extending to a free end and said lower crown portion has an annular rib extending to a free end, said free ends being attached to one another by a weld joint, wherein a portion of said free edge extends substantially planar with said weld joint.

* * * * *